Nov. 9, 1948.　　　　J. T. FREDERICK　　　　2,453,427
LOAD RETAINER FOR HAND TRUCKS
Filed Nov. 29, 1946　　　　　　　　　　　2 Sheets-Sheet 1
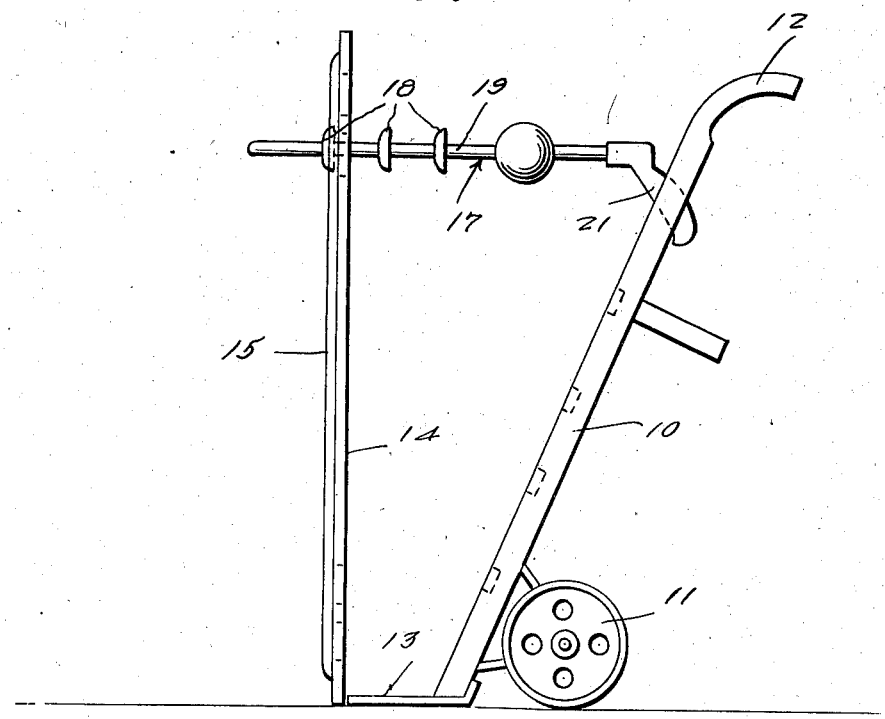
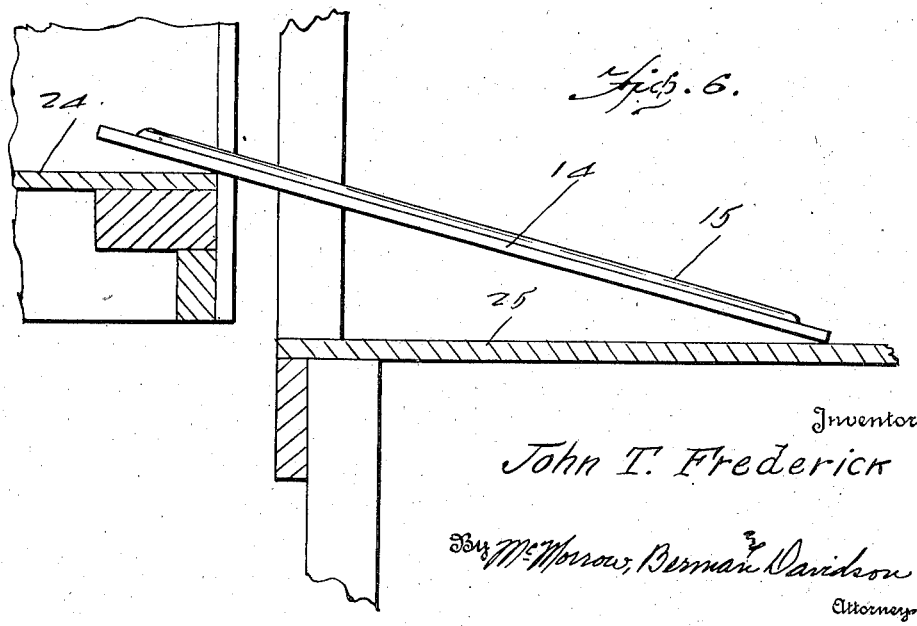
Inventor
John T. Frederick
By McMorrow, Berman & Davidson
Attorneys Nov. 9, 1948.                J. T. FREDERICK                 2,453,427
                      LOAD RETAINER FOR HAND TRUCKS
Filed Nov. 29, 1946                                    2 Sheets-Sheet 2
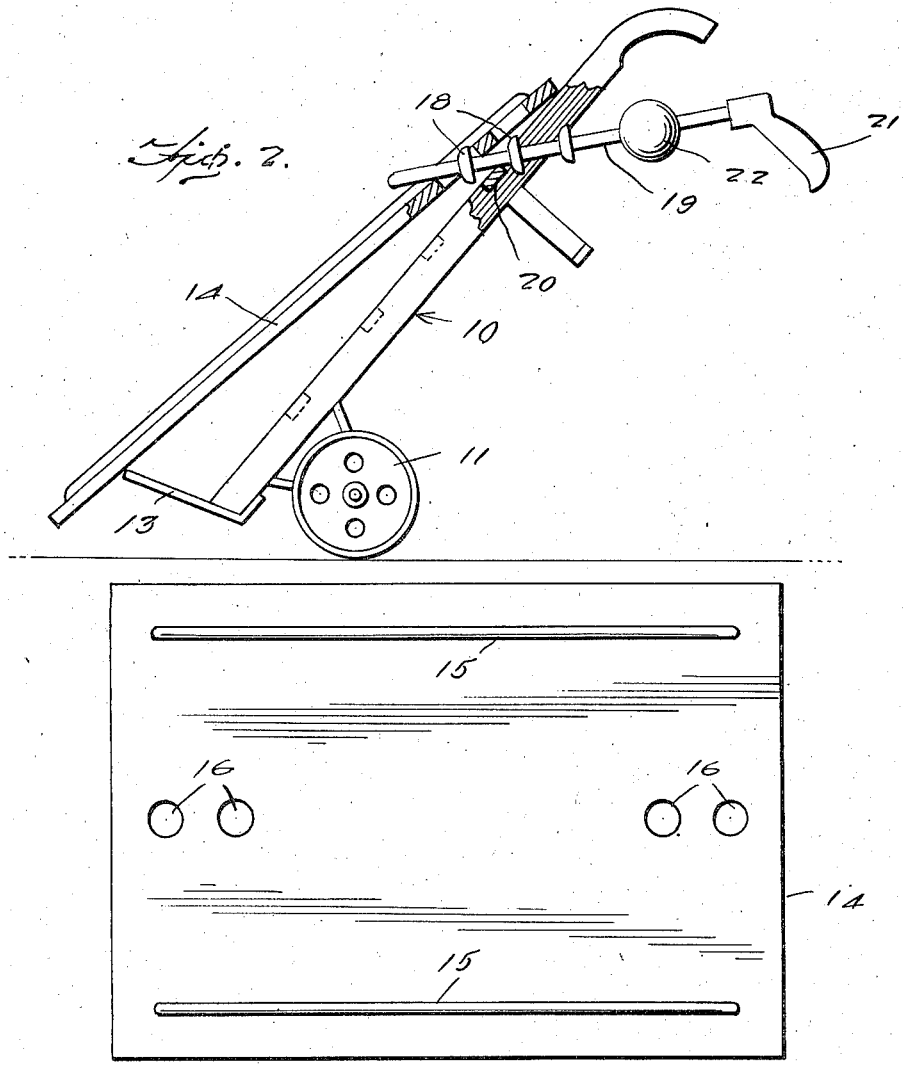

Patented Nov. 9, 1948

2,453,427

UNITED STATES PATENT OFFICE 2,453,427

LOAD RETAINER FOR HAND TRUCKS

John T. Frederick, Huntington, W. Va., assignor of one-half to Charles E. Green, Huntington, W. Va.

Application November 29, 1946, Serial No. 713,187

1 Claim. (Cl. 294—1)

This invention relates to a safety catch used in conjunction with hand trucks for placing and removing iron steps or bridges adapted to extend between the shipping platform and a box car to be loaded with freight.

These iron steps or bridges weigh two or three hundred pounds and are difficult to move about without the use of a truck. Furthermore, when a truck is used, it is difficult to retain the step or bridge upon the truck while the same is being transported. Accordingly, it is an object of the present invention to provide a safety catch adapted to be connected between the bridge when upon the hand truck and the transverse portion of the hand truck to retain the same against sliding from the truck.

It is another object of the present invention to provide a device which can be readily separated from the truck at times when the truck is used for purposes other than moving the bridge or steps, and wherein the device can, at the time when the truck is to be used for transporting the bridge or steps, be easily applied to the truck and easily connected with the bridge.

It is another object of the present invention to provide a catch used in handling steps or bridges on trucks which will have provision for preventing the catch from getting out of control of the handler and to eliminate any possibility of the device slipping so that the handler might be injured.

For other objects and for a better understanding of the invention, reference may be had to the following detailed description taken in connection with the accompanying drawings, in which:

Figure 1 is a side elevational view of a hand truck with a bridge supported upon end upon the ground and with the truck in position to receive the same, and of the handling device extended through an opening in the top of the bridge preparatory to being withdrawn for engagement with the cross-bar of the truck.

Figure 2 is a side elevational view of the truck and of the plate with portions of the truck and plate broken away to show the manner in which the handling tool is connected between the bridge and the cross-bar of the truck, as the bridge is being transported.

Figure 3 is a top plan view of the bridge and showing holes in the opposite ends of the same.

Figure 4 is an enlarged fragmentary view of the portion of a plate about one of the holes, and with the tool disposed therein.

Figure 5 is a fragmentary view of a tool with a portion broken away to show the shape of one of the flanges.

Figure 6 is a cross-sectional view of a loading platform and of a car bottom, and with the bridge or step extended between them.

Referring now to the figures, 10 represents a truck of the hand variety having wheels 11 and a handle portion 12 thereon. At the bottom of the truck is a forwardly extending tongue 13 adapted to engage with the bottom edge of a step or bridge 14 made of heavy iron and often weighing two or three hundred pounds. This step or bridge may be ribbed, as indicated at 15, to strengthen the same, and has at the opposite ends thereof holes 16 with which the handling tool may engage for connection with the bridge.

When the step or bridge 15 is on end, as shown in Figure 1, the forward end of a tool 17 is extended through one of the openings 16. This tool 17 has a plurality of longitudinally spaced flanges 18 thereon adapted to extend through the opening 16 and catch with the rear face of the bridge when offset within the opening. The flanges 18 are upon a rod portion 19 which has a handle formation 21 at its rear end. By grasping the handle portion 21, the forward end of the rod 19 can be readily thrust through the opening 16. With the flange 18 in engagement with the rear face of the bridge, the bridge can be pulled rearwardly by the tool 17 so that another flange 18 can be seated over a cross-bar 20 on the truck. At the same time, the bridge 14 will slide downwardly over the end of the tongue 13, but will be retained against further sliding movement and against displacement from the truck by the portion of the rod 19 extending between the two flanges 18 connected respectively with the bridge and the truck cross-bar 20.

A large ball 22 on the rod portion 19 of the tool will protect the hand of the person using the tool at times when the tool may slide through the truck and over the cross-bar 20. The ball 22 will cause the rear end of the tool to raise up as it passes the cross-bar 20, thereby to make the hand of the person using the tool free of the cross-bar 20.

After the bridge 14 has been transported to its location where it is to be used, the tool 17 can be released from the cross-bar 20 and the bridge raised so that the tool can be completely made free of the same. The bridge 14 can extend, as shown in Figure 6, onto a box car bottom 24 and onto a loading platform 25. In this position trucks loaded with supplies can pass from the platform into the box car for the purpose of loading the car.

Having now described my invention, I claim:

In a handling tool adapted for securing a heavy bridge to a hand truck, and comprising an elongated member having a plurality of projections thereon spaced apart to form a series, the features which include a rod forming the elongated member having a series of spaced symmetrical flanges fixed thereon to form the spaced projections, an offset open hand grip rigid upon one end of the rod for manipulating said rod and thrusting it with at least one flange through an opening in the bridge to engage the flange with the far side of said bridge and simultaneously engage another flange with a crossbar on the truck to prevent said bridge from sliding on the forward end of the latter, and a large heavy ball symmetrically fixed upon said rod intermediate the hand grip and the first or innermost flange on said rod.

JOHN T. FREDERICK.

REFERENCES CITED

The following references are of record in the file of this patent:

UNITED STATES PATENTS

| Number | Name | Date |
|---|---|---|
| 552,467 | Brown | Dec. 31, 1895 |
| 1,028,428 | Brunello | June 4, 1912 |
| 1,470,526 | Cade | Oct. 9, 1923 |
| 1,580,188 | Wright | Apr. 13, 1926 |
| 2,040,134 | Heller | May 12, 1936 |

FOREIGN PATENTS

| Number | Country | Date |
|---|---|---|
| 513,448 | Great Britain | Oct. 12, 1939 |